Dec. 26, 1939.   C. J. LAURER ET AL   2,184,427
OPHTHALMIC MOUNTING
Filed Dec. 27, 1937
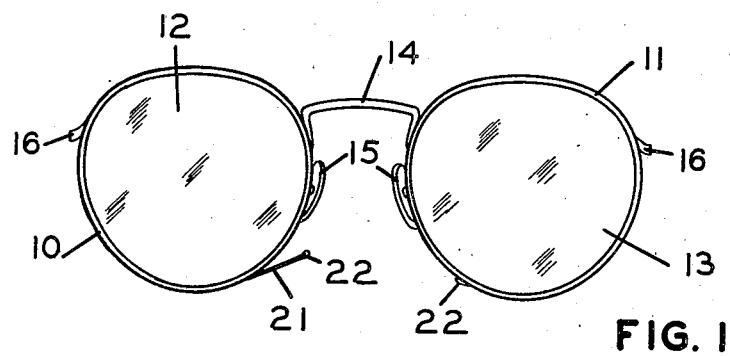
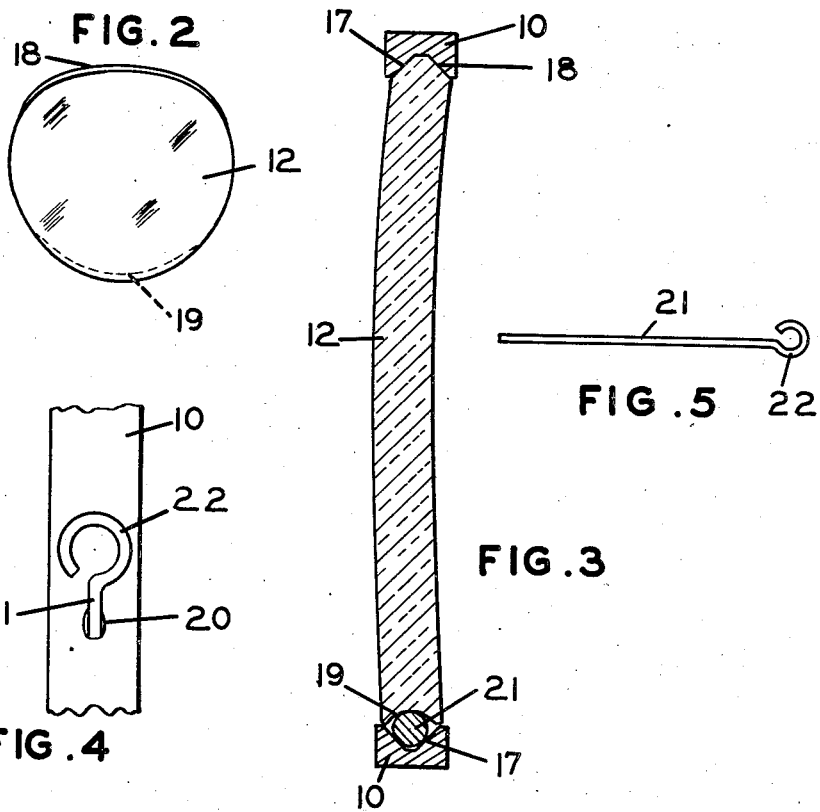
CARL J. LAURER
STANLEY MARKELL
INVENTORS Patented Dec. 26, 1939

2,184,427

UNITED STATES PATENT OFFICE 2,184,427

OPHTHALMIC MOUNTING

Carl J. Laurer and Stanley Markell, Rochester, N. Y., assignors to Bausch & Lomb Optical Company, Rochester, N. Y., a corporation of New York Application December 27, 1937, Serial No. 181,731

3 Claims. (Cl. 88—47)

The present invention relates to ophthalmic mountings and more particularly to means for securing lenses in ophthalmic mountings.

One of the objects of the present invention is to provide a new and improved ophthalmic mounting. Another object is to provide a new and improved means for securing lenses in an ophthalmic mounting. A further object is to provide an ophthalmic mounting having a closed eyewire and releasable means for securing a lens therein. These and other objects and advantages reside in certain novel features of construction, arrangement and combination of parts as will hereinafter be more fully set forth and pointed out in the appended claims.

Referring to the drawing:

Fig. 1 is a front elevation of a pair of spectacles embodying our invention.

Fig. 2 is a front elevation of the lens.

Fig. 3 is an enlarged vertical section through the lens and eyewire.

Fig. 4 is an enlarged fragmentary view of the eyewire with the locking wire in place.

Fig. 5 is a detail view of the locking wire.

A preferred embodiment of our invention is illustrated in the drawing wherein 10 and 11 designate two eyewires carrying lenses 12 and 13, respectively, and connected by a bridge 14. The usual nose pads 15 and endpieces 16 are secured to the eyewires 10 and 11 in the usual manner. The eyewire 10 and lens 12 are substantially identical with the eyewire 11 and lens 13 so that only the former will be described.

The eyewire 10 is permanently closed as by soldering or the like and has on its inner surface a continuous groove 17. The lens 12 which is secured in the eyewire 10 is formed with a bevel 18 extending along one edge, shown in Fig. 2 as the upper edge, and a groove 19 is formed in the edge of the lens 12 opposite the bevel 18. The other edges of the lens 12 are preferably substantially flat. When placed in the eyewire 10, the bevel 18 of the lens 12 engages in the groove 17 of the eyewire 10 while the groove 19 in the lens 12 faces the groove 17 on the opposite side. The eyewire 10 has a small aperture 20 adjacent the groove 19 in the lens 12 and this aperture 20 opens into the groove 17.

In order to lock the lens 12 in the eyewire 10, a small rod or wire 21 is inserted into the aperture 20 and into the grooves 17 and 19 so that it engages both the lens 12 and eyewire 10 and locks the lens 12 against removal as shown in Fig. 3. The rod or wire 21 has a small loop or hook 22 at its outer end so that it may be readily and easily removed or inserted.

In mounting the lens 12 in the eyewire 10, the bevel 18 is placed in the groove 17 and the lens pressed into the eyewire until the groove 19 is in alignment with the groove 17. The locking wire 21 is then inserted through the opening 20 and the lens locked in place.

Of course, the locking element 21 could take many forms and any substance which would engage in both grooves 17 and 19 would suffice. A soft, fluid or plastic material which would set in the grooves would, of course, be adequate.

From the foregoing, it will be apparent that we are able to attain the objects of our invention and provide an ophthalmic mounting having a closed eyewire and means for releasably securing a lens therein. Various modifications can, of course, be made without departing from the spirit of our invention or the scope of the appended claims.

We claim:

1. In an ophthalmic mounting, a closed eyewire having a continuous inner groove, a lens mounted in said eyewire, said lens having a bevel along one edge engaging in the groove in the eyewire, said lens having a groove along the edge opposite said bevel, the groove in the lens being opposite the groove in the eyewire, said eyewire having an opening therethrough adjacent the groove in said lens, and a wire extending through said opening and engaging in both the groove in the eyewire and the groove in the lens to lock said lens in said eyewire.

2. In an ophthalmic mounting, a closed eyewire having a continuous inwardly facing groove, a lens mounted in said eyewire, said lens having a bevel along one edge engaging in the groove in said eyewire, a groove along the edge opposite said bevel, and flat sides between said bevel and said groove, and a locking element movably positioned in said grooves and engaging both the lens and the eyewire and preventing removal of the lens from the eyewire.

3. In an ophthalmic mounting, a closed eyewire having a continuous inwardly facing groove, a lens mounted in said eyewire, said lens having a bevel along one edge engaging in the groove in the eyewire, a groove along the edge opposite the bevel, and flat edges between the bevel and the groove, said eyewire having an opening therethrough adjacent the groove in said lens, and locking means extending through said opening and along both the groove in the eyewire and the groove in the lens for securing the lens in the eyewire.

CARL J. LAURER.
STANLEY MARKELL.